United States Patent [19]

Baker et al.

[11] Patent Number: 5,097,425

[45] Date of Patent: Mar. 17, 1992

[54] PREDICTIVE SCANNING INPUT SYSTEM FOR RAPID SELECTION OF VISUAL INDICATORS

[75] Inventors: Bruce R. Baker, Pittsburgh, Pa.; David Hershberger, Millersburg, Ohio; Edward Gasser, Sterling, Ohio; Clifford Kushler; Barry Romich, both of Wooster, Ohio

[73] Assignee: Semantic Compaction Systems, Pittsburgh, Pa.

[21] Appl. No.: 536,022

[22] Filed: Jun. 11, 1990

[51] Int. Cl.⁵ .............................................. G10L 5/00
[52] U.S. Cl. ............................................ 395/2; 381/51
[58] Field of Search ................................. 381/51-53; 364/513.5; 341/21; 340/825.19

[56] References Cited

U.S. PATENT DOCUMENTS

| | | | |
|---|---|---|---|
| 4,567,469 | 1/1986 | Danish et al. | 341/21 |
| 4,661,916 | 4/1987 | Baker et al. | |
| 4,682,159 | 7/1987 | Davison | |
| 4,785,420 | 11/1988 | Little | 364/513.5 |
| 4,788,649 | 11/1988 | Shea et al. | 364/513.5 |

OTHER PUBLICATIONS

The Effectiveness of Language Redundancy in Non-Verbal Communication, by Foulds et al., early 1970's.

*Primary Examiner*—Emanuel S. Kemeny

[57] ABSTRACT

A predictive scanning input system provides predictive selection of individual indicators corresponding to keys on the keyboard to input a previously stored plural word message to a processor and subsequently to an output device. The predictive scanning input system of the present invention allows the user to select only a limited number of keys which can produce a previously stored message involving an initially detected symbol corresponding to a first key which has been operated. The system operates in conjunction with a keyboard containing a plurality of icons or polysemic (many-meaning) symbols to allow a user to access plural word messages or sentences previously stored in the memory thereof, for selective retrieval by the keyboard. The predictive scanning input system, in conjunction with the symbols containing these polysemic symbols or icons, can be adjusted to a user's needs to aid a user in communication through previously stored plural word messages, by actuation of only a limited number of keys further limited by activation of visual indicators of the predictive scanning input system corresponding to each of a plurality of symbol sequences containing an initially detected symbol. This thereby defines to a user a limited number of keys which can produce a stored message involving an initially detected symbol.

52 Claims, 8 Drawing Sheets

PREDICTIVE SCANNING INPUT SYSTEM FOR RAPID SELECTION OF VISUAL INDICATORS

BACKGROUND OF THE INVENTION

The present invention relates to a predictive scanning input system for rapid selection of visual indicators corresponding to keys on the keyboard, each key corresponding to one of a plurality of symbols. The predictive scanning relates to an input system to be utilized to input information to later be synthesized to produce audible or recorded data. In one preferred embodiment, the system relates to an input system for a linguistic coding system for use by people unable to use their own voices to create either a synthesized speech or synthetic printed messages. The input system is directed toward a system upon which, upon activation of a first key, a plurality of visual indicators are activated on certain of the remaining keys when they are found to correspond to a plurality of symbol sequences which may be formed utilizing the initial input symbol of the activated first key. Thus, it thereby defines a limited number of keys which can produce a stored message involving that initial input key. Therefore, the input message can then be utilized to create synthetic speech or be output to a printing device, with the processed information being based on a sentence or message rather than a word, phoneme or letter.

Previously, a system and method for producing synthetic plural word messages was developed by Bruce Baker et al and is disclosed in U.S. Pat. No. 4,661,916 to Baker et al and issued on Apr. 28, 1987, the disclosure of which is incorporated herein by reference. The system is directed to a linguistic coding system and keyboard for the use of people unable to use their own voices. The coding system and associated keyboard are based on sentences rather than a word, phoneme or letter.

In such a system, the keyboard is coupled to a computer which stores a plurality of plural word messages or sentences in the memory thereof for selective retrieval by the keyboard. The sentences retrieved from the keyboard are fed to a voice synthesizer which converts them through a loudspeaker to produce audible spoken messages. The keyboard utilizes polysemic (many-meaning) symbols, also known as icons, corresponding to respective keys. By designating selected ones of the keys and their associated symbols, selected recorded plural messages may be accessed from the memory.

With the system described in U.S. Pat. No. 4,661,916, however, plural messages in the memory could be retrieved from memory by actuating a combination of designated primary message theme keys and other keys to vary the context of the polysemic symbols. Thus, a plurality of sentences could be selectively generated as a function of polysemic symbols in combination with other symbols. However, if a scanning system is utilized to activate the plurality of keys on the keyboard, it can take an extremely long amount of time to activate each of the switches corresponding to a sequence of symbols needed to access a particular message.

Row-column scanning system have previously been developed to sequentially access rows and columns of a keyboard. In row-column scanning, each row lights up in succession. When the row is illuminated which contains the key which a user desires to select, a switch is hit. After the user has hit the switch, then each key in succession from left to right in that row lights up. When a desired key is illuminated, the switch is hit again. Thus, each key selection requires two actuations. The first actuation determines the row and the second actuation determines the column. Row-column scanning is usually very slow. The more keys a user must scan through, the longer it takes.

SUMMARY OF THE INVENTION

The present invention was designed to improve the row-column scanning system utilizing various input devices and to further create an improved input system utilizing a predictive-scanning method.

More specifically, the system of the present invention was designed for use by people with diseases such as ALS, for example, commonly known as Lou Gehrig's disease. It is usually fatal, but some people live with Lou Gehrig's disease for decades. Almost everybody who has the disease loses the ability to speak or use handsigns within the first two years. These people need a scanning system which is easy to operate and efficient.

According to a first embodiment of the present invention, it is an object of the present invention to provide a predictive scanning system which can be utilized in conjunction with an input device to provide a quick and efficient input system easy for a user to utilize.

It is another object of the present invention, in this preferred embodiment, to create a predictive scanning system which defines and activates only a limited number of keys which can produce a stored message involving an initially detected symbol.

It is a further object in this preferred embodiment of the present invention, to provide a predictive scanning input system for predictive selection of individual indicators corresponding to keys on the keyboard, to input symbols to a voice synthesization system, to thereby produce an audibly stored message.

It is a further object in this preferred embodiment to utilize the predictive input system of the present invention in a language translation system.

It is a still further object, in a second preferred embodiment of the present invention, to produce a predictive scanning system which, when a first key is activated by any one of a plurality of input systems containing a polysemic (multi-meaning) symbol or icon, can indicate to a user which of a plurality of a limited number of additional icons may be accessed to produce a stored message involving the initially input icon.

It is a further object of the invention in this second preferred embodiment to utilize this predictive scanning system to input an accessed plural word message to a voice synthesization system or language translation system.

It is yet another object of the present invention in either of the first and second embodiments, to define a limited number of keys which may be accessed upon detecting that a first key has been accessed to provide a user with a system which quickly and efficiently defines a limited number of keys which can produce a stored message involving an initially detected icon on an initially accessed key.

The objects of the present invention are fulfilled by providing this quick and efficient predictive scanning input system for use in conjunction with a voice synthesizing system such as that of the aforementioned U.S. Pat. No. 4,661,916 to Baker et al, for example. That previously developed system and method for producing synthetic plural word messages stored in memory in response to the actuation of selected keys on a keyboard, each key bearing a polysemic symbol or icon related, in combination with other icons, to a message to be retrieved, enabled generation of plural word messages or whole sentence messages by the actuation of only a few keys. Further, with a system containing plural word messages having messages related to the respective polysemic symbols or icons on the keyboard, allowed for selective activation of a plurality of messages in combination with the associated icons on the keys.

The system of the previous invention in U.S. Pat. No. 4,661,916, as well as that of the present invention, allows for an operator to go directly from thought to speech. This is possible because each key on the keyboard bears a central image or symbol which is polysemic and illustrates an important aspect of life and/or linguistic function. The keyboards can be varied depending on the intellectual level of the intended operator. Therefore, each keyboard can in itself be a language which is designated for or with a specific user. Each of the polysemic symbols are developed to be rich in association and in combination signal sentence ideas in the operators memory. This enables the generation of plural word or whole sentence messages by the activation of only a limited number of keys. The device allows for a generation of at least one hundred sentences which can be easily retrieved from memory because of the ease which the polysemic symbols on the keys portray the production of whole thoughts.

Therefore, as can clearly be seen, the objects of the present invention are fulfilled by enhancing the input system of the previous linguistic coding system, including utilizing a keyboard with polysemic symbols or icons associated with each of the plurality of keys, by use of predictive scanning. By indicating to the user which of the plurality of polysemic symbols or icons, on only a limited number of keys, may be accessed after accessing an initial key, the system of the present invention, in a preferred embodiment, can thus define a limited number of keys which can produce a stored message involving the initially detected symbol. Further, by utilizing a polysemic input keyboard in conjunction with the aforementioned row-column scanning of the keyboard, a more efficient, quicker, predictive scanning system can also be realized. Thus, such a system can be realized which defines a limited number of keys which may produce a stored message involving an initially detected key and can thus limit the number of rows and columns which need to be accessed.

These and further objects of the invention will become more readily apparent from the understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein.

The above-mentioned drawings will be described in detail in the following description.

DETAILED DESCRIPTION OF THE PREFERRED EMBODIMENT

Figure 2:
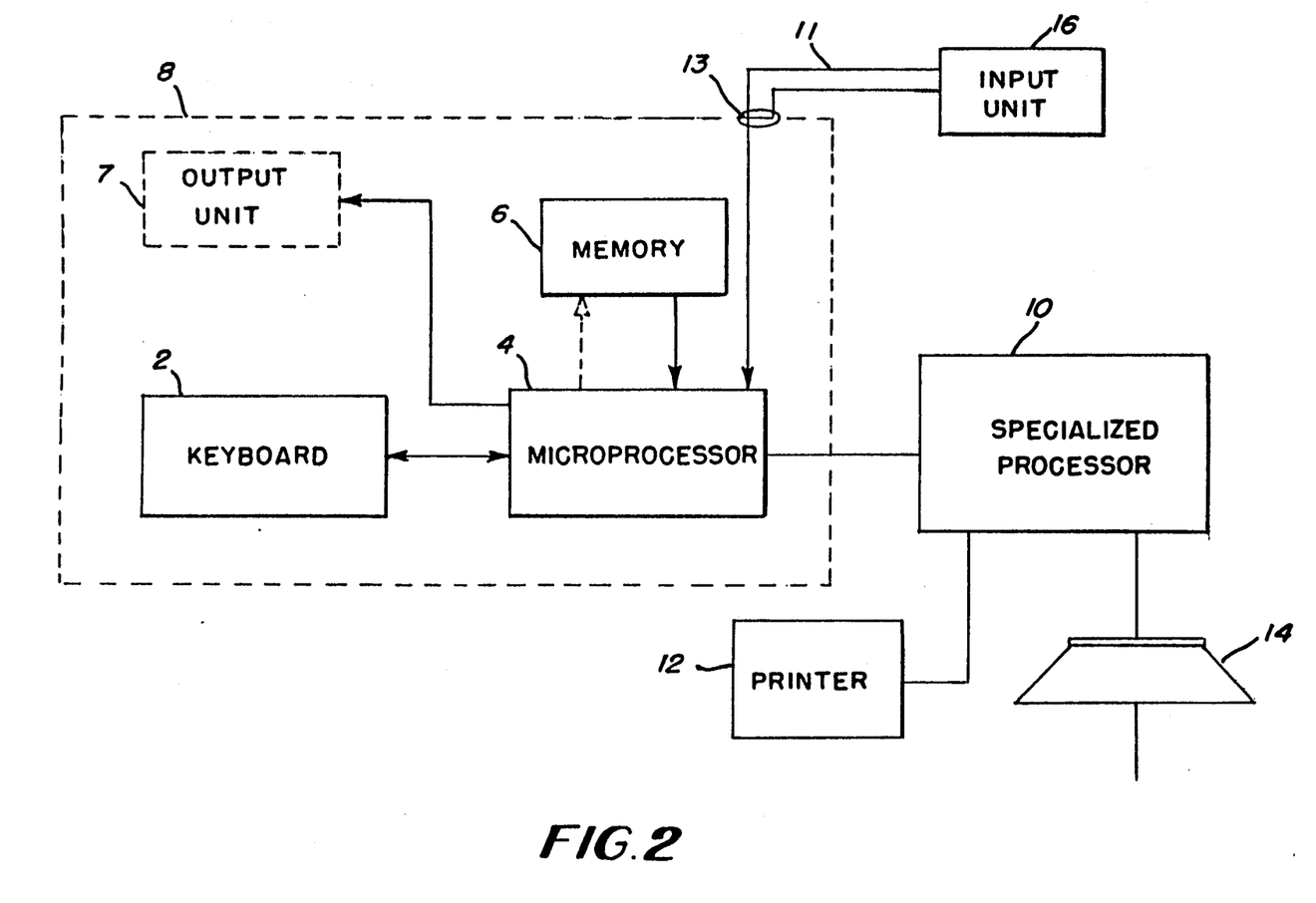
FIG. 2 illustrates the input system of a preferred embodiment of the present invention in conjunction with a specialized processing system and corresponding output units.

Referring to FIG. 2, there is illustrated the predictive input scanning system of the present invention, generally designated 8. The predictive input scanning system 8 is shown in conjunction with a specialized processor 10 and output units printer 12 and speaker 14. The predictive input scanning system 8 generates input for the processor 10 based on accessing information corresponding to polysemic symbols of the keyboard 2. Alternatively, the specialized processor 10 may be located within the printer 12 to receive input from the predictive input scanning system 8 and subsequently output processed information to printer 12.

Further, the predictive input scanning system 8 may include an output unit 7. This device 7 can be one of a processor and speaker to generate audible sound waves, an infrared light source to generate infrared light, or any similar type output device which can be utilized in conjunction with one of a plurality of different input devices 16. The input device 16 may be one of a plurality of input devices (which will be described subsequently) which is utilized in conjunction with the output device 7 and the microprocessor 4 to activate signals corresponding to the plurality of keys on the keyboard and thus indicate selection of a particular key. Further, this input device 16 can be connected to the microprocessor 4 through a cable 11 which is attached to an input port 13 of the system 8. Thus, a plurality of various input units 16 may be utilized to effect key selection and actuation without depressing a key on the keyboard.

The processor 10 may be a language translator, a voice synthesizer or any other similar-type processor which may process plural word messages, accessed by the predictive input scanning system 8. Upon processing the accessed plural word message, the message may then be output to a printer 12 to print a desired hard copy, a speaker 14 to output an audible message corresponding to the accessed stored plural word message or any similar-type output device used to communicate the accessed plural word message to another person. The specialized processor 10, for example, may be one of a commercially available speech synthesizer such as the Voltrax speech SPAC within SC-01 voice synthesizer chip therein, marketed by Voltrax. The output of the synthesizer, or a similar specialized processor, may be in turn coupled to a speaker 14 to generate audible synthetic speech in a manner well known in the art.

Figure 3:
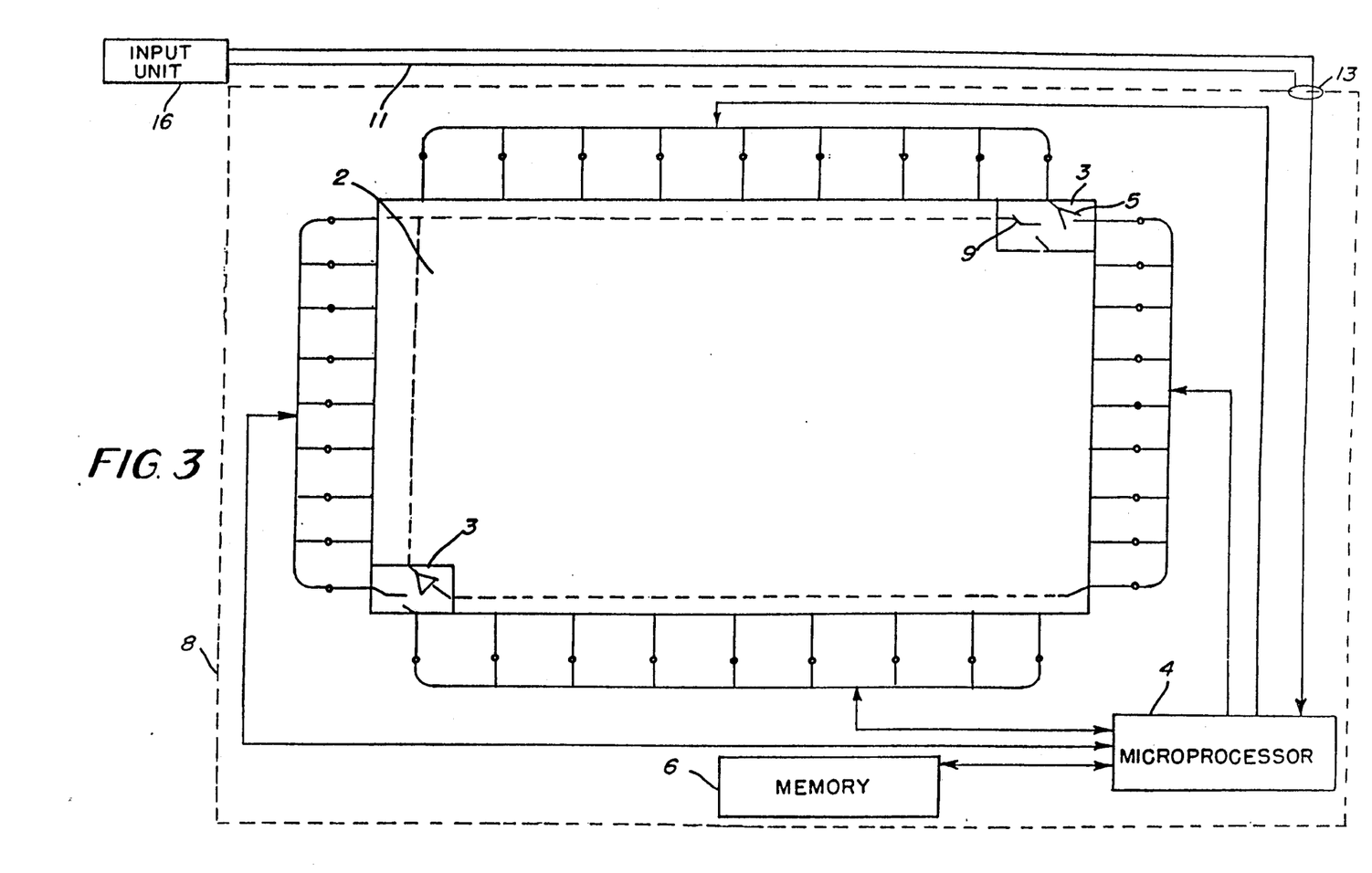
FIG. 3 illustrates the input system of a first preferred embodiment of the present invention.
Figure 4:
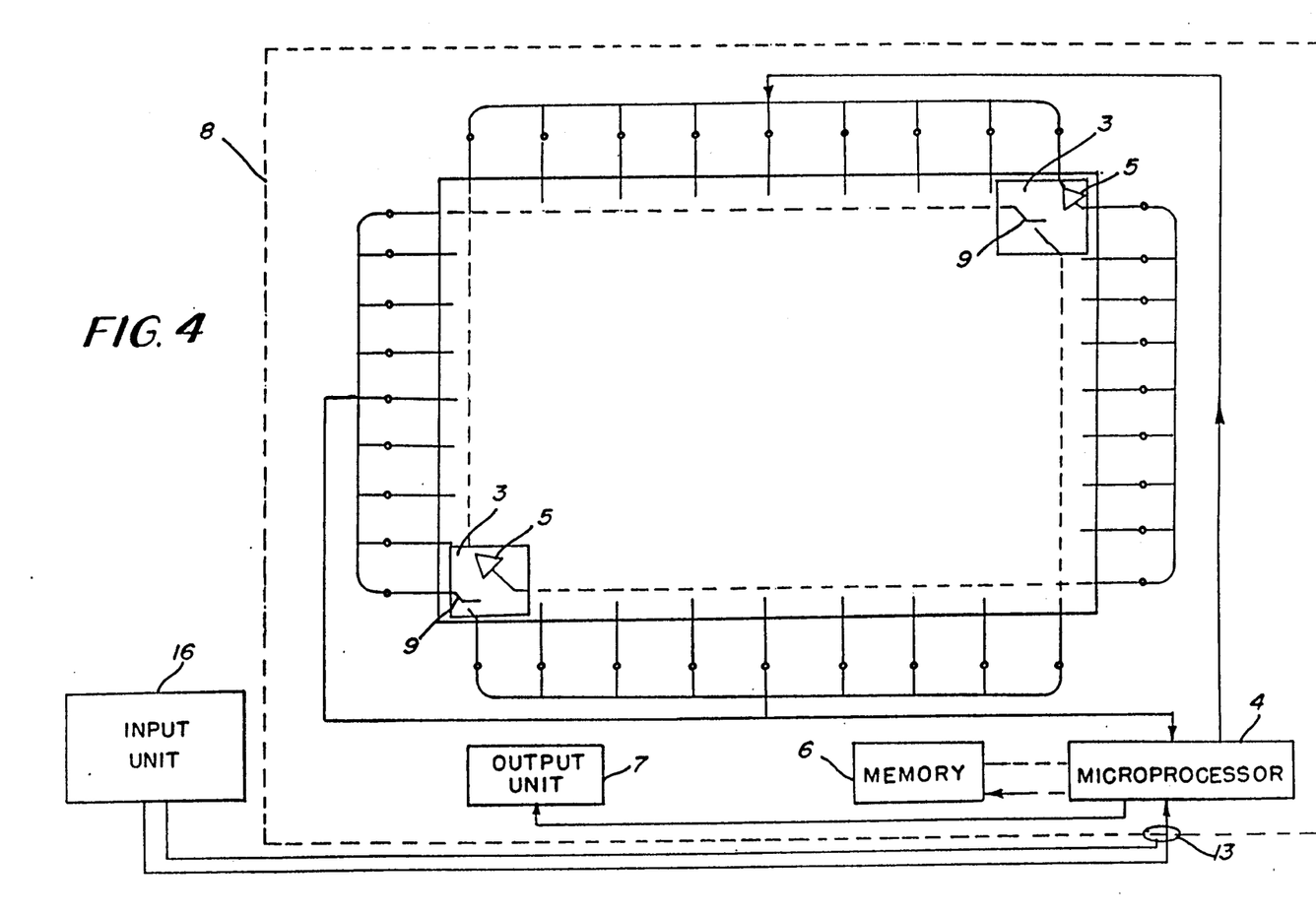
FIG. 4 illustrates a second preferred embodiment of the input system of the present invention.

The actual predictive scanning input system 8 comprises mainly a keyboard 2, a microprocessor 4 and a memory 6 and optionally an output unit 7, depending on the particular input device utilized, as shown in FIG. 4, for example. Further, as shown with regard to FIGS. 3 and 4, the predictive scanning input system 8 can further include an input device 16. The main elements of the predictive scanning input system 8, as shown in FIG. 2, are components conjunctively utilized to detect the activation of a first of plurality of keys on the keyboard 2; storing a plurality of symbols sequences and a corresponding message in a memory 6, detecting when one of the plurality of keys has been activated which corresponds to each of a plurality of symbols stored in the memory, via a microprocessor 4; comparing the detected symbol on the initially activated key to the various symbol sequences in the memory 6 to determine which of the plurality of symbol sequences contain the detected symbol; and for activating visual indicators on each of the plurality of keys of the keyboard 2 which correspond to each of the plurality of symbols in the symbol sequences containing the detected symbol, to thereby define a limited number of keys which can produce a stored message involving that detected symbol.

Figure 1:
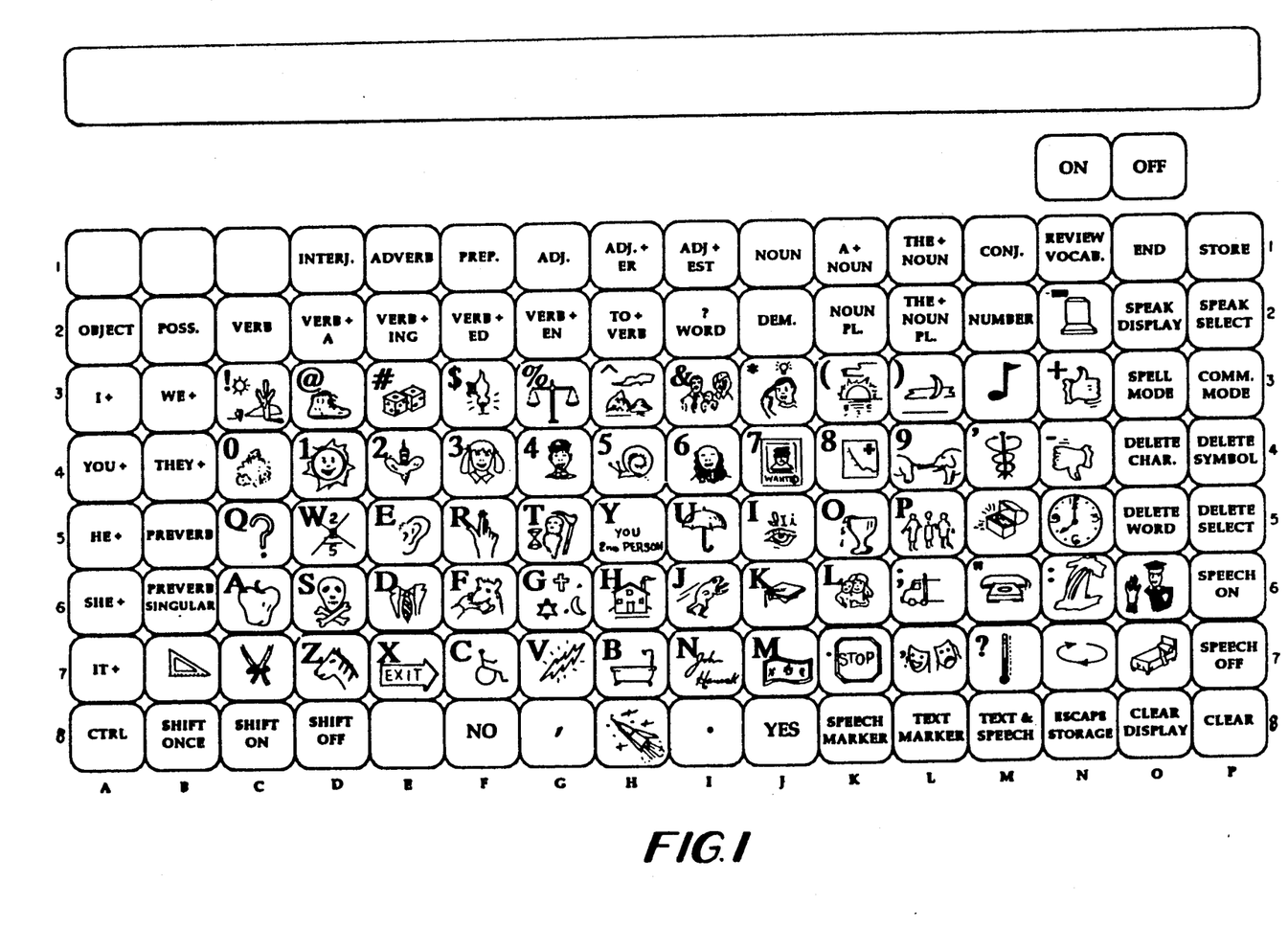
FIG. 1 illustrates a preferred embodiment of the input unit or keyboard of the present invention.

FIG. 3 illustrates a first preferred embodiment of the predictive scanning input system 8 of the present invention. In this preferred embodiment, the keyboard 2 is arranged such that keys 3 are formed in a plurality of rows and columns. Each of the plurality of keys contains a polysemic symbol or icon, or a part of speech or specific instruction, or a type of mode. Examples of the various keys on the keyboard are shown in FIG. 1. It is the keys with the polysemic symbols or icons which can be utilized to access each of the stored plural word messages in memory. Further, the parts of speech keys can also be utilized in conjunction with the icon keys to produce icon sequences pertaining to particular plural word messages stored in the memory 6. Two such examples of the keys on the keyboard are shown by 3 in FIG. 3.

As a key is depressed or actuated through the microprocessor via the input device 16, a particular row corresponding to the key and a particular column corresponding to the key are both supplied with a predetermined voltage so as to actuate a switch 9 corresponding to the key. As this switch 9 is actuated, that particular key has thus been activated.

Further, as can be seen with regard to FIG. 1, each of the plurality of keys on the keyboard further contain a visual indicator or light. These lights are shown by a dark circle in the lower left hand corner of each key, in FIG. 1. Further, as can be seen in FIG. 3, each of the lights may be, for example, light emitting diodes (LEDs) 5 which emit a red light indicating to a user a key which can be activated to produce a stored message involving an initially detected key (note that the positioning of the lights in the figures is merely illustrative and the positioning is not limited to that shown in the figures). This will be more clearly described subsequently with regard to the first embodiment of the present invention.

These LEDs 5 are activated by a microprocessor 4 sending a predetermined voltage to a particular row and column corresponding to a particular key 3. Further, with regard to a first embodiment of the present invention, each of the plurality of rows and columns of LEDs 5 are sequentially activated, first by row and then by column. However, with the predictive scanning system of the present invention, in this first preferred embodiment, it is only the rows and columns of a limited number of keys 3, corresponding to a plurality of symbol sequences containing an initially detected symbol to thereby define a limited number of keys which can produce a stored message involving the detected symbol, which are activated during the sequential row-column type scan. This first embodiment of the present invention will be described subsequently in detail with regard to FIG. 5 and FIGS. 6a and b.

Further, with regard to FIG. 3, an input device is shown as 16. This input device can be, for example, that of a switch. The switch is then utilized in conjunction with microprocessor 4 and memory 6 to access certain keys on the keyboard, and to actuate certain light emitting diodes 5 corresponding to certain keys 3 on the keyboard.

The switch can be any kind which, when it is activated by the user, sends a signal through cable 11 and port 13 to the microprocessor, equivalent to key actuation. The switch may be one activated by the user's breath (a "puffer switch") by the user's tongue, by movement of the user's head, etc. Thus, the particular type of switch to be utilized as input unit 16 can be suited to a user's needs and ability.

The scanning system operates in a row-column scanning type of operation. Therefore, when a row is sequentially accessed by the microprocessor which contains a key which the user decides to select, a switch of the device 16 is activated. (Activation is dependent upon the switch utilized, for example, the user may activate the switch by a simple head movement.) The hitting of this switch sends a signal which is sent to microprocessor 4 through cable 13. Subsequently, after the user has activated the switch on the device 16, each of the various columns on the keyboard are then made accessible. When a desired key is made accessible to the user, the user again activates a switch on device 16. Similar to that which has been previously described, this signal generated by switch 16 is sent to microprocessor 4. Thus, each key selection by activation of the switch 16 requires both a row and column actuation to select a particular icon corresponding to a selected key. The first actuation determines the row and the second actuation determines the column. This row-column scanning system, in conjunction with the predictive scanning system of the present system, will be described subsequently with regard to FIGS. 5 and FIGS. 6a and 6b.

FIG. 4 illustrates a second preferred embodiment of the present invention. Similar to that of FIG. 3, in the second preferred embodiment a keyboard is utilized which contains a plurality of keys arranged in rows and columns. Further, each of these keys 3 contains both a visual indicator (LED) 5 and a switch 9. However, contrary to that of FIG. 3, actuation of each of the keys on the keyboard is not achieved via activation of a single switch. In this embodiment, actuation of each of the keys may be accomplished by a user merely depressing one of the keys with either his finger, a headstick or any other similar type device, depending on the user's abilities. Therefore, once a key is depressed, switch 9 is closed and the key is thus actuated.

Upon actuating a key, the microprocessor 4 then detects the particular row and column corresponding to that activated key. The microprocessor 4 then interacts with memory 6, in a manner to be described subsequently with regard to FIG. 7 of the present invention. Further, the microprocessor 4 can then input voltages of a predetermined level to certain rows and columns of each of the keys, to light a visual indicators corresponding to certain of the keys to which the voltage of a predetermined level has been supplied. Upon receiving this voltage of a predetermined level from the microprocessor 4, an LED 5 corresponding to key supplied with the voltage of a predetermined level, will then light up.

Any number of input devices 16 can be utilized in place of the above-mentioned headstick. These devices send signals from an input unit 16, through cable 11 to the microprocessor 4, for example, to simulate specific key activation. Further, some of these devices are utilized in conjunction with an output device 7 controlled by microprocessor 4. Some examples of such devices will subsequently be explained.

One type of input device 16 which may be utilized is the "Light Talker". The "Light Talker" device can be worn on a user's head and contains a detection device. As the microprocessor 4 detects activation of a particular row and column corresponding to a key, and interacts with memory 6 (to be subsequently described with regard to FIG. 7), the microprocessor 4 then lights certain LED's 5 on certain keys (it will be subsequently described how these certain keys are selected). The LED's for each of the selected keys are then sequentially pulsed at a rate approximately 30 times a second, for example. The user then turns his head to look at the desired one of the selected keys which he wishes to activate. The detection device of the "Light Talker" then detects light from the pulsing LED's. A signal is sent from the "Light Talker", through cable 11 and to microprocessor 4. The microprocessor 4 then determines, at the time of light detection by the detection device, which one of the selected keys was pulsed. As this key is determined by the microprocessor 4, the input device thus has achieved simulated specific key activation without the need for the user to depress any of the keys through means of the "Light Talker" input device. (Note that this specific example is described regarding simulated key activation after a first key has been selected. However, when selecting a first key, the same process is utilized with each of the LED's being sequentially pulsed.)

A second example of an input device 16 which may be utilized as a simulated key activation is that of the "Headmaster" described in U.S. Pat. No. 4,682,159, which is incorporated herein by reference. The "Headmaster" is an ultrasonic device which sits on a user's head, similar to the "Light Talker", and contains a plurality of detectors. The device is connected to the microprocessor 4 by a cable 11, for example, through an input port 13. Similar to the description given regarding the above-mentioned "Light Talker", the "Headmaster" operation will subsequently be described corresponding to the microprocessor 4 initially having detected the row and column of a first key. The simulated activation of this first key, it should be noted, can occur through operation of the "Headmaster" in a similar manner as will now be described in relation to simulated activation of a subsequent key.

Upon the microprocessor 4 detecting activation of a particular row and column corresponding to a first key, and interacting with memory 6 (to be subsequently described in FIG. 7), the microprocessor then sends a signal to output device 7. Further, similar to that described previously regarding the "Light Talker", LED's corresponding to certain selected keys will be lit by the microprocessor 4. In the case of the "Headmaster", the output device outputs a sound wave or audible signal. However, the present invention is not limited to such an audible output device. One of ordinary skill would realize that any output device could be utilized such as that of an infrared light emitter (or similar light or sound output device), in conjunction with a corresponding detector on the input device 16, such as an infrared detector (or similar light or sound receiving device).

The headpiece of the "Headmaster" contains a plurality of detectors, for example, three, which receive the output signal wave at a particular angle, depending upon which key on the keyboard the user desires to activate (simulate activation). Thus, the user need only move his head to look at a desired key, corresponding to one of the certain previously lit keys (it will subsequently be described how keys are selected to be lit), to thus simulate activation of that particular key. The detectors send signals corresponding to the detected angles of the sound wave back to the microprocessor 4. The detectors can send positional signals or, preferably, signals relating to change of position of a user's head. The microprocessor then can translate this change of position into x and y coordinates and correspond the x and y coordinates to the keyboard to thus simulate activation of a selected key.

Further, regarding the predictive scanning of the present invention, by the user utilizing the "Headmaster", x and y coordinates are related to the keyboard to simulate activation of a key, as previously described. However, if this simulation results in detection by microprocessor 4 of a key which is not one of the certain previously lit keys (referenced previously and to be described subsequently in detail), no simulated activation of that key will occur. However, by utilizing a system such as the "Headmaster" in combination with a predictive scanning system limiting key activation to only certain specific keys, the microprocessor 4 can then simulate activation of the closest possible selectable key to thereby allow a user a certain margin of error in positioning his head to select a key. This will greatly improve accuracy of simulated key input.

A further example of an input device 16 is that of an infrared light detector to detect light angle and relay x and y coordinates, similar to the "Headmaster" as previously described. Further, the present invention is not limited to these previously described input devices. Any device which one of ordinary skill in the art would readily recognize as utilizable in such a system as that of either embodiment of the present invention could be substituted. Further, a modification of the previously mentioned input devices, to suit the device to a particular user's needs, abilities, or limitations, within the purview of one of ordinary skill in the art may also be utilized. Thus, instead of a headpiece, sensors on another movable body part, under selectable control by the user, can also be utilized.

Hereinafter, the second embodiment will be described with regard to direct activation of keys on the keyboard (by a user pressing a key with his finger, for example), but it should be noted that activation, or simulated activation may occur by any one of the input means discussed and contemplated previously and further by any other method as would be apparent to one of ordinary skill in the art. Thus, direct selection of keys is utilized for illustrative purposes only and should not in any way be considered limiting with regard to the present invention.

Through the use of the various components of the predictive input scanning system as shown in FIG. 4, the components can conjunctively be utilized to detect the activation of a first of a plurality of keys on the keyboard and for determining the symbol corresponding to the activated key in the microprocessor 4. Further, the memory 6 stores a plurality of symbol sequences, each with a plurality of symbols corresponding to a plurality of keys on the keyboard. Further, the memory stores plural word messages, one corresponding to each of the plurality of symbol sequences. The microprocessor 4 can then access the memory 6 to compare the detected symbol to the plurality of symbol sequences stored in the memory 6, to determine which of the plurality of symbol sequences contain the detected symbol and which, of the plurality of keys 3 on the keyboard 2, correspond to each of the plurality of symbol sequences. Finally, the microprocessor 4 may output a voltage of a predetermined level to visual indicators 5 to activate a visual indicator on each of a plurality of keys 3 determined to correspond to each of the plurality of symbol sequences containing the initially detected symbol, to thereby define the limited number of keys which can produce a stored message involving the initially detected symbol. The details of this aspect of the second preferred embodiment of the present invention will be subsequently described with regard to FIG. 7.

Figure 5:
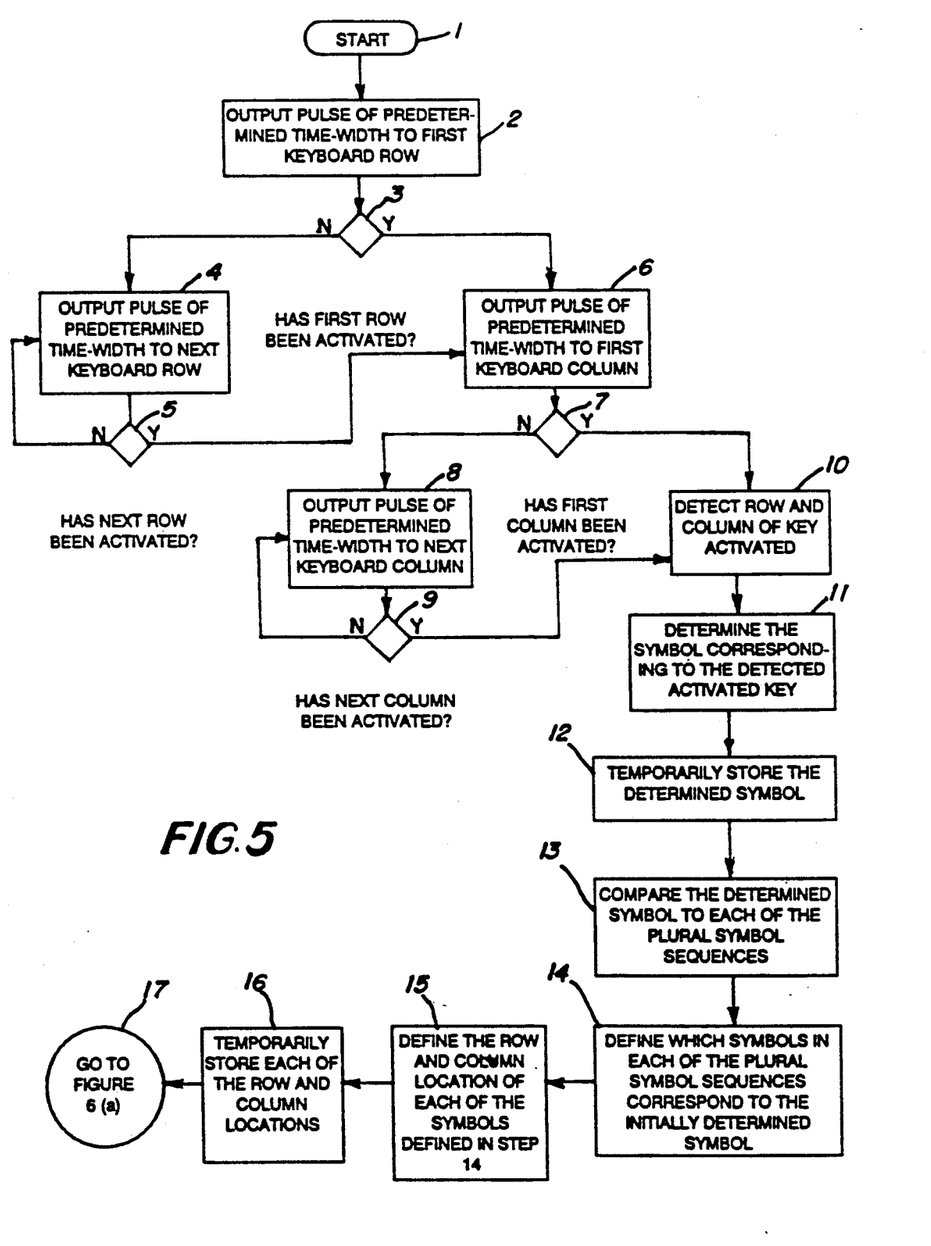
FIG. 5 illustrates a flow chart corresponding to the operation of the input system shown in FIG. 3.

FIG. 5 illustrates a flow chart corresponding to the activation and initial detection of a first key activated by the predictive scanning system of the present invention, in a first preferred embodiment. Initially, the system is started. Then the microprocessor 4 outputs a pulse of a predetermined time width to the first row of the keyboard 2, corresponding to the uppermost row on the keyboard. This allows the user of the device to operate the switch 16, to actuate the first row of the keyboard if a key, corresponding to a certain polysemic symbol or icon, appears in that row. The microprocessor 4 monitors switch 16 to determine if switch 16 has been actuated indicating that the first row has been activated. If it is determined in step 3 of FIG. 5 that the first row has not been activated, the system moves to step 4.

At step 4, the microprocessor then outputs a pulse of a predetermined time width to the next keyboard row. The microprocessor then continually monitors switch 16 to determine if it detects actuation of the switch 16 indicating that a particular row has been activated. This is shown in step 5 of FIG. 5. However, if the microprocessor determines that the next row has not been activated, upon termination of the predetermined time corresponding to the output pulse of the predetermined time width previously output, the microprocessor then outputs a pulse of a predetermined time width to the next keyboard row in a sequential manner. Thus, the system in this first preferred embodiment of the present invention operates in a sequential row scanning manner. Similarly, as will be subsequently described, the device operates in a sequential column scanning manner. Thus, the present invention, in this preferred embodiment, operates in a row-column scanning manner.

If it is determined that the first row has been activated in step 3 or that any of the next rows have been activated in step 5, the system then moves to step 6 of FIG. 5. At step 6 of FIG. 5, the microprocessor then outputs a pulse of a predetermined time width to the first keyboard column corresponding to the leftmost keyboard column. The system then moves to step 7 to determine whether the first column has been activated. During this time, the microprocessor continually monitors switch 16 to determine if the switch 16 has been actuated. If it is determined by the microprocessor that the first column has not been activated over the predetermined time period corresponding to the predetermined time period of the output pulse, the system moves to step 8 where a pulse of a predetermined time width is then output to the next keyboard column. Thus, as previously described, the system operates in a sequential column scanning manner, accessing each of the plurality of columns on the keyboard from left to right, sequentially.

The system then moves to step 9 to determine if the next column has been activated. Similarly, as previously described, the microprocessor continually monitors switch 16 for detection of switch actuation. If it is determined by the microprocessor that the switch 16 has not been actuated during the predetermined time period corresponding to the predetermined time width of the previously output pulse, the microprocessor then returns to step 8 and outputs a pulse of a predetermined time width to the next keyboard column. This sequential accessing of each of the columns on the keyboard, from left to right, operates in a similar manner. The microprocessor continually monitors the switch 16 and awaits its output signal indicating that the switch 16 has been actuated thus activating a particular column. Upon detecting that a particular column has been activated in steps 7 or 9 of FIG. 5, the system then moves to step 10.

At step 10, the microprocessor then detects which particular row and column correspond to the key which has been activated. The system then moves to step 11 where the microprocessor then determines the symbol corresponding to that detected activated key. In step 12, the microprocessor then temporarily stores the previously determined symbol. The system then moves to step 13 where the microprocessor accesses the memory 6 to compare the previously determined symbol to each of the plural symbol sequences which have been previously stored in memory 6.

With regard to the present invention, prior to the activation of this predictive scanning input system, the memory 6 has been preprogrammed with a plurality of symbol sequences corresponding to a plurality of plural word messages. The memory is provided to store complete sentences or plural word messages rather than individual words, phonemes or letters. The plural word messages are stored corresponding to various combinations or polysemic symbol sequences corresponding to polysemic symbols or icons located on a plurality of keys on the keyboard. This is possible because each key on the keyboard of the present invention bears a central image or symbol which is polysemic and illustrates an important aspect of life and/or linguistic function. Further, the keyboard may vary depending on the intellectual level of the intended operator. Therefore, each key may itself be a language which has been designed for or with a specific user. Each of the polysemic symbols is rich in associations and in combination, signals sentence ideas to the operator's memory. This enables the generation and initial storage of plural word or whole sentence messages by the actuation of as few as two keys or as many as several keys.

Therefore, the memory 6 stores a plurality of plural word messages corresponding to plural symbol sequences of icons previously selected on the keyboard, to which a user can readily associate. These symbol sequences are preprogrammed into the memory, usually by someone of a higher intellect than that of a user or someone with higher physical capabilities to suit the needs of user.

The symbols can be programmed, for example, by a person initially accessing the "store" key. Then, the person may actuate the question mark key (corresponding to the key with the capital Q on it), the Father Time symbol (corresponding to the key with the capital T on it) and the house symbol (corresponding to the key with the capital H on it), in that order. The person can then select the "end" key and subsequently spell the sentence "What time are we going home?" This is done by sequentially inputting the letters corresponding to the above-mentioned sentence. The person can then select the store button and thus, each of the plurality of symbols in the above-mentioned symbol sequence will be stored in the memory 6, along with a corresponding plural word message or sentence. This symbol sequence, of three symbols, is merely utilized for representational purposes only and the present invention is not limited to such three symbol sequences. Sequences may correspond to as few as two symbols or as many as several symbols (for example, 7).

As previously described, with regard to FIG. 5, upon temporarily storing the determined symbol in step 12, the microprocessor then accesses the memory 6 to compare the determined symbol to each of the plural symbol sequences stored in the memory. These plural symbol sequences, and corresponding plural word messages, are preprogrammed into the memory, by a method as previously described, or by any similar or compatible storage method.

The system then moves to step 14 where it is defined which of the symbols in each of the plural symbol sequences correspond to the initially determined symbol. The microprocessor then defines the row and column location of each of the symbols defined in step 14 and step 15 of FIG. 5. Therefore, upon defining these row and column locations, the system moves to step 16 where each of the row and column locations are temporarily stored within a memory. The system then moves to step 17 which will be subsequently described with regard to FIG. 6a. However, it is to be noted that upon completing step 16 of FIG. 5, the initial activation of a first key has been detected and the predictive scanning of the present invention can now be operated to aid the user by defining a limited number of keys which can produce a stored message involving the initially detected symbol corresponding to the initially activated key.

Figure 6A:
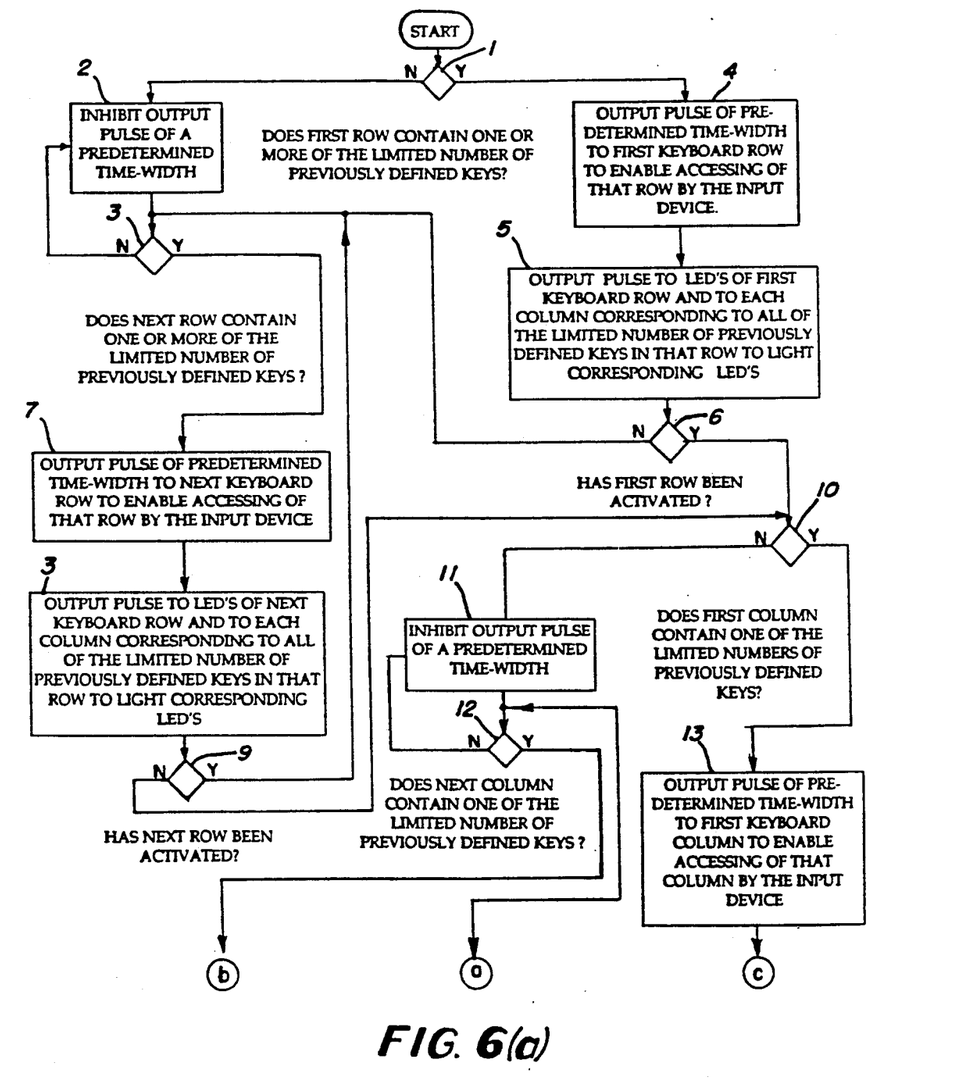
FIGS. 6a and 6b illustrate a flow chart further describing the operation of the first preferred embodiment of the present invention, shown in FIG. 3.

In FIG. 6a, the microprocessor initially determines if any of the previously defined symbols of the plural symbol sequences corresponding to the initially detected symbol are located in the first row of the keyboard. In other words, does the first row contain one or more of the limited number of previously defined keys established with regard to FIG. 5? Upon determining that the first row does not contain one or more of the limited number of previously defined keys in step 1 of FIG. 6a, the system then moves to step 2. At step 2, the microprocessor then inhibits an output pulse of a predetermined time width and thus, does not output such a pulse to the keyboard. The system then moves to step 3 where the microprocessor determines whether the next row contains one or more of the limited number of previously defined keys. Upon determining that the next row does not contain one or more of the previously defined keys, the system reverts back to step 2 where the microprocessor constantly will inhibit the output pulse of a predetermined time width upon detecting that each of the plurality of rows does not contain a limited number of one of the previously defined keys.

However, upon the microprocessor detecting that the first row does contain one or more of the limited number of the previously defined keys in step 1, the system then moves to step 4. At step 4, an output pulse of a predetermined time width is then output to the first keyboard row to enable accessing of that row by the scanning device, in a similar manner to that previously described with regard to step 2 of FIG. 5. However, as previously described with regard to step 2 of FIG. 6a, output pulses are only sent to a keyboard row if it is detected that that row contains one or more of a limited number of previously defined keys. Therefore, upon determining that the row does not contain one or more of the limited number of previously defined keys, an output pulse is inhibited and thus not sent to that row.

Upon outputting the pulse in step 4, the system then moves to step 5 where an output pulse of a predetermined time width, and further of a predetermined voltage, is then sent to the visual indicators or LEDs of the first keyboard row, and to each column corresponding to all of the limited number of previously defined keys in that row to light each of the corresponding LEDs. Therefore, as previously described with regard to FIG. 3, the microprocessor outputs a voltage of a predetermined voltage level to both the row and column of each of the LEDs corresponding to the limited number of previously defined keys in that row, to light each of the corresponding LEDs. By lighting each of the corresponding LEDs in the row, which correspond to the limited number of previously defined keys which can produce a stored message involving the initially detected symbol, a predictive scanning input system of the present invention is achieved. Thus, the user can clearly see, by use of the visual indicators which of the plurality of keys may be actuated, to access one of the previously stored messages.

Further, in a conventional column-row scanning system, each of the columns and rows are sequentially activated. However, in the predictive scanning column-row input system of the present invention, as shown in FIG. 3, and described with regard to FIGS. 5 and 6a and 6b, only rows which correspond to the limited number of previously defined keys which can produce a stored message involving the initially detected symbol, are sequentially accessed. This, therefore, provides a quick and efficient system which skips unnecessary rows corresponding to keys which cannot access a stored message, and fully visually indicates to the user which of the plurality of the keys in an accessible row corresponds to keys which can produce a stored message involving the initially detected symbol.

Subsequently, upon lighting the limited number of previously defined keys in the first row in step 5, it is determined in step 6 if the first row has been activated. Therefore, as previously described, the microprocessor monitors the switch 16 for actuation indicating that the input device 16 has activated that particular row. Upon the microprocessor not detecting that the first row has been activated, the system reverts back to step 3 where it is determined whether or not the next row contains one or more of the limited number of previously defined keys. Subsequently, the system advances to step 7 of FIG. 6a.

At step 7, the microprocessor then outputs a pulse of a predetermined time width to the next keyboard row to enable accessing of that row by the scanning device. Further, at step 8 of FIG. 6a, the microprocessor outputs a pulse of a predetermined voltage to the visual indicators or LEDs of that next keyboard row and to each column corresponding to all the limited number of keys in that row to light the corresponding visual indicators or LEDs. Therefore, similar to step 5 of FIG. 6a, a visual indicator is activated for each of the plurality of keys, in the row made accessible by way of steps 3 and 7 of FIG. 6a, which were previously determined to correspond to each of the plurality of symbol sequences containing the detected symbol of the initially activated key. This thereby defines a limited number of keys which can produce a stored message involving that detected symbol.

Subsequently, in step 9, it is determined whether or not that next row has been activated. The microprocessor monitors the switch 16 to determine if the switch 16 has been actuated. If the microprocessor does not detect the signal from switch 16 indicating that the row has been activated, the system subsequently reverts back to step 3 where it is determined if the next row contains one or more of the limited number of previously defined keys. However, if it is determined that the next row has been activated in step 9 or that the first row has been activated in step 6, the system then moves to step 10.

At step 10, it is determined whether or not the first column contains one of the limited number of previously defined keys, similar to that of steps 1 and 3 corresponding to the rows of the keyboard. Thus, the microprocessor then checks the temporarily stored row and column locations previously defined as corresponding to symbols which were found to be in plural symbol sequences corresponding to the initially determined symbol. Upon the microprocessor determining that the first column does not contain one or more of the limited number of previously defined keys, the system then moves to step 11 where the microprocessor inhibits an output pulse of a predetermined width. Thus, there is no pulse of a predetermined time width output to the first column of keys on the keyboard and thus that column is not made accessible to the user. This is because that first column was determined not to contain any symbols which correspond to the plurality of symbol sequences containing the initially detected symbol, corresponding to the initially activated key. Therefore, by not accessing that particular column, the system will be able to clearly define only a limited number of keys which can produce a stored message involving the initially detected symbol and initially activated key.

At step 12, it is then determined whether or not the next column contains one of the limited number of previously defined keys. If it is determined that this next column does not contain one of the limited number of previously defined keys, the system will then revert back to step 11 and an output pulse will not be sent to the next column, thus making that next column nonaccessible to the user. By the row-column scanning system of the present invention, skipping plural rows and columns which do not contain symbols corresponding to symbol sequences containing the initially detected symbol, only a limited number of keys will be defined which can produce a stored message involving the initially detected symbol. Further, rows and column which do not contain one of the limited number of previously defined keys, will not be made accessible to the user. Thus, the speed and efficiency of the system is clearly increased, as well as being made more easily accessible to the user by lighting visual indicators corresponding to only the limited number of the previously defined keys in a particular row or column.

Figure 6B:
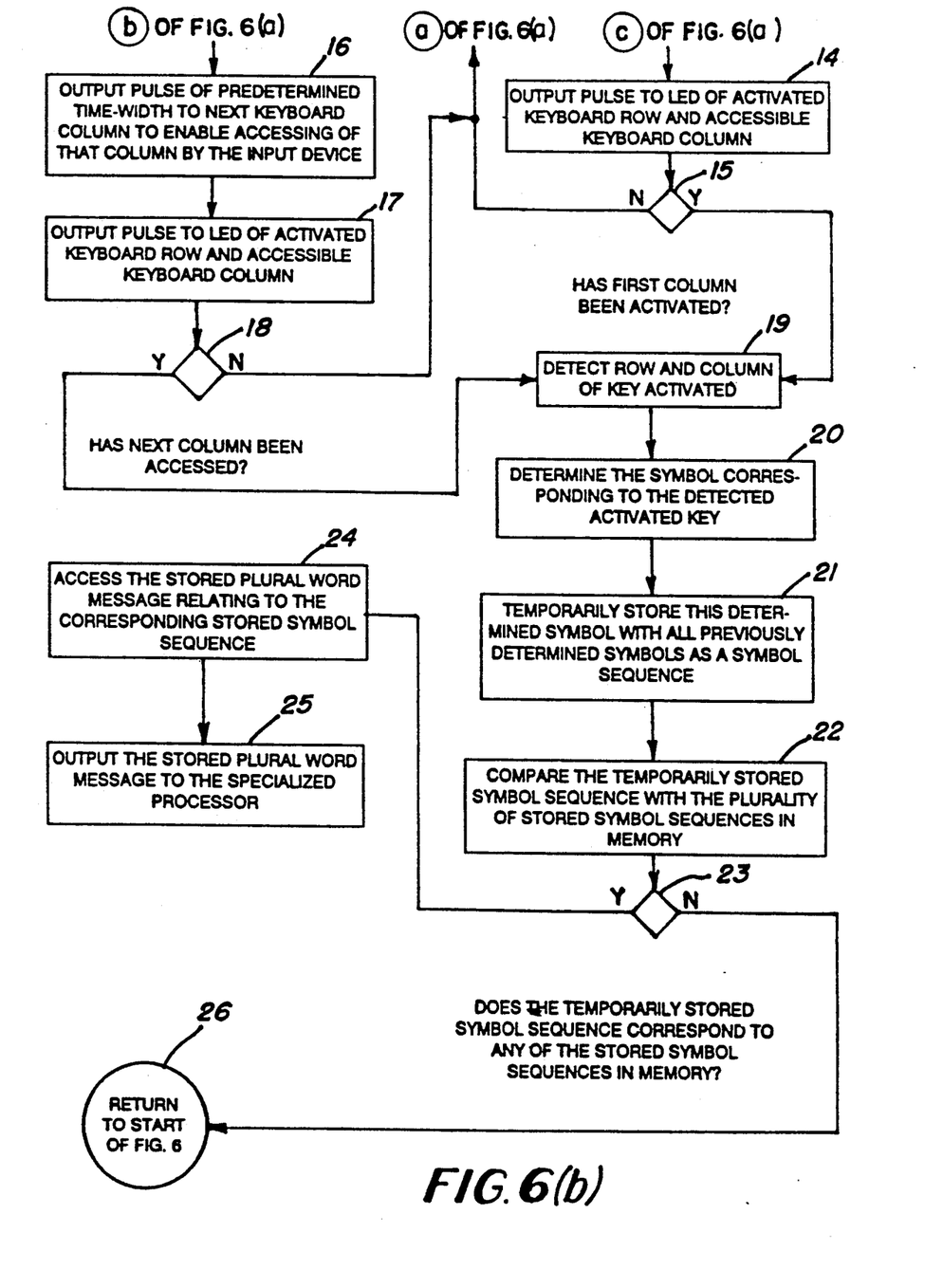

Upon determining that the first column does contain one or more of the limited number of previously defined keys in step 10 of FIG. 6a, the system then moves to step 13. At step 13, an output pulse of a predetermined time width is output to the first keyboard column to enable accessing of that column by the scanning device. Further, in step 14, as shown in FIG. 6b, an output pulse of a predetermined voltage is output to the visual indicator of the previously activated keyboard row and the previously determined accessible column. Therefore, in step 15, the user can then activate that particular column by way of the scanning device 7. At step 15, the microprocessor determines if the switch 16 has been actuated to activate the first column. However, if the microprocessor determines that the first column has not been activated, the system reverts back to step 12.

If the microprocessor determines that the next column does contain one of the previously defined keys in step 12 of FIG. 6a, the system then moves to FIG. 6b. Subsequently, an output pulse of a predetermined time width is then sent to the next keyboard column to enable accessing of that column by the input device 16. Further, in step 17, an output pulse of a predetermined voltage is then sent from the microprocessor 4 to the visual indicator or LED 5 corresponding to the previously activated keyboard row and previously determined accessible keyboard column. At step 18, the microprocessor then determines if that next column has been activated. The microprocessor monitors the switch 16 to determine if the switch 16 has been actuated indicating that the next column has been activated. If it is determined that the next column has been activated in step 18, or that the first column has been activated in step 15, the system then moves to step 19 where the microprocessor then detects the row and column of the key which has been activated. Subsequently, the system moves to step 20.

In step 20, the microprocessor then determines the symbol corresponding to the detected activated key. Upon determining this symbol, the microprocessor then temporarily stores this determined symbol in the memory with all previously determined symbols as a symbol sequence in step 21. In step 22, the microprocessor then accesses the memory 6 to compare this temporarily stored sequence with a plurality of stored symbol sequences in memory. At step 23, the microprocessor determines if the temporarily stored symbol sequence corresponds to any one of the stored symbol sequences and memory. If the microprocessor determines that this temporarily stored symbol sequence does not correspond to any one of the stored symbol sequences in memory, the system returns to the start step of FIG. 6a in step 26. Therefore, a third key may then be activated corresponding to a third symbol which then may form a symbol sequence in conjunction with the previously detected symbols, to form a symbol sequence which can produce a stored message. Thus, subsequent input of plural additional symbols can be achieved. It is further noted that further plural keys may be activated to access stored messages corresponding to symbol sequences of more than three symbols. Thus, the above-mentioned process is merely continuously repeated to access further symbols and therefore the system is not limited to two or three symbol sequences.

If the microprocessor determines that the temporarily stored symbol sequence does correspond to any one of the stored symbol sequences in memory in step 23, the system then moves to step 24. At step 24, the microprocessor then accesses these stored plural word messages from memory relating to the corresponding stored symbol sequence. This plural word message may then be output to a specialized processor 10 as shown in FIG. 2 in step 25. Further, the specialized processor 10 can then process the plural word message and then output the message through an output device such as speaker 14. Therefore, a predictive scanning input system, utilizing a row-column scanning method can be achieved to aid the user in predicting which of a plurality of keys can be depressed which correspond to the plurality of symbol sequences containing an initially detected symbol. This thereby defines a limited number of keys which can produce a stored message involving an initially detected symbol. Further, the row-column scanning system of the present invention also utilizes the predictive scanning of the present invention to allow only certain of the rows and columns accessible to the user. Thus a much more efficient system, as well as a much more helpful user friendly type system, is achieved.

Figure 7:
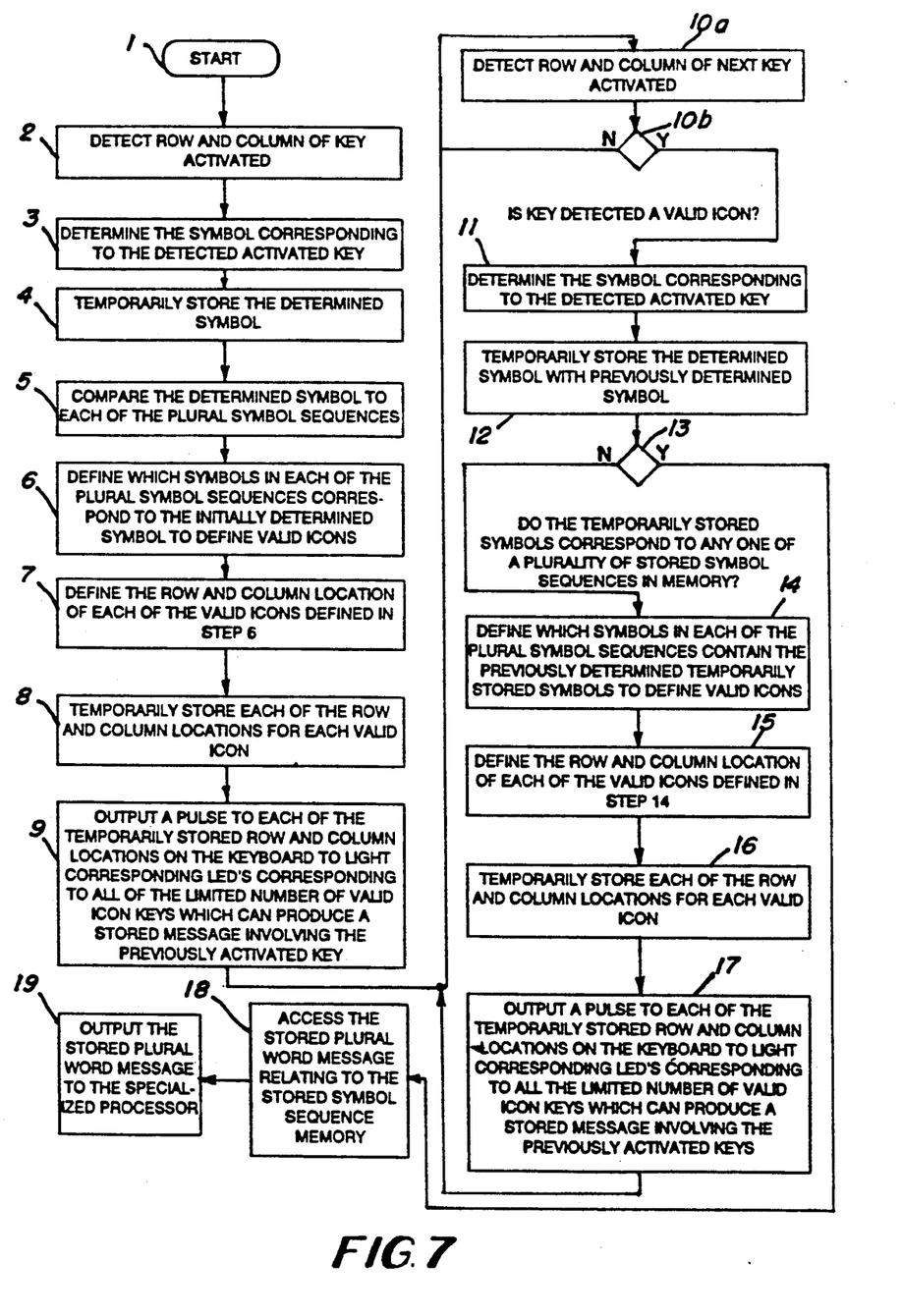
FIG. 7 illustrates a flow chart corresponding to the operation of a second preferred embodiment of the present invention illustrated in FIG. 4.

FIG. 7 illustrates the operation of a second preferred embodiment of the present invention, corresponding to that of FIG. 4. This embodiment of the present invention utilizes the predictive scanning input system, but merely allows for activation of each of the plurality of keys on the keyboard by direct activation of one of the plurality of previously mentioned systems, other than that of a switch in row-column scanning. Activation of each of the plurality of keys in this embodiment of the present invention may be achieved by means of a user's finger or any other appendage which he can utilize to depress any one of the keys on the keyboard; a headstick which can be used to activate and depress any of the plurality of keys by movement of a user's head; or any other equivalent type of input devices previously described for direct key activation. This embodiment will be described with regard to direct key depression for activation but is not limited to such a system. The keys may be activated by any of the previously mentioned input devices 16 or any other method of direct key selection as is known to one of ordinary skill in the art.

Initially, in step 1 of FIG. 7, the system is started. However, subsequent to the start of the system, the memory 6 may be preprogrammed with a plurality of symbol sequences corresponding to a plurality of stored messages suited to the user's needs and abilities, as previously described with regard to the first preferred embodiment of the present invention.

The system, after the start in step 1, then moves to step 2 wherein the microprocessor then detects the row and column of the key which has been activated by the user. Upon a user depressing a particular key 3, the switch 9 will close and a signal will be detected by the microprocessor 4. From this signal, the microprocessor can then detect the row and column of the key activated in step 2.

At step 3, the microprocessor then determines the symbol corresponding to the detected activated key. The symbol is then temporarily stored in step 4 and subsequently the system moves to step 5.

In step 5, the microprocessor then accesses the memory 6 for each of the plurality of previously stored symbol sequences. This plurality of previously stored symbol sequences is then compared with the previously determined symbol corresponding to the detected activated key of step 3. By comparing the symbol to each of the plurality of symbol sequences in step 5, the microprocessor can then move to step 6 to define which symbols in each of the plurality of symbol sequences correspond to the initially determined symbol. Therefore, the microprocessor determines which of the plurality of symbols correspond to each of the plurality of symbol sequences containing the initially detected symbol. This thereby defines a limited number of keys or valid icons which can produce a stored message involving the initially detected symbol. Then, in step 7, the microprocessor defines the row and column location of each of the symbols or valid icons previously defined in step 6.

In step 8, the microprocessor then temporarily stores each of the row and column locations corresponding to the previously defined valid icons of step 6. A pulse of a predetermined voltage is then output to each of the temporarily stored row and column locations on the keyboard in step 9, to light corresponding visual indicators or LEDs corresponding to all of the limited number of keys which can produce a stored message involving the previously activated key. Therefore, by lighting each of the plurality of LEDs which correspond to the previously defined limited number of valid icon keys which can produce a stored message involving the initially detected symbol, a predictive scanning input system of this embodiment of the present invention conveys to the user which keys are available for subsequent activation. The LEDs act as visual indicators to aid the user in making his next selection.

The system then moves to step 10a where the microprocessor, in conjunction with the keyboard 2, detects the row and column of the next key activated similar to that of step 2. In step 10b, the system then determines if the next key activated is one of the valid icon keys previously determined. By only defining a limited number of valid icon keys, the system has limited the possibility of user input error by the user depressing the wrong key. In a normal keyboard, the keys are fairly close together, and thus if a user is slightly impaired in his capability for key input, a mistake depression of the wrong key will likely not cause input error. This is because only certain of a limited number of keys can be activated. Upon the system detecting a key which is not one of the previously defined valid icon keys, the system merely reverts back to step 10a and waits for input of a valid icon key.

Further, regarding the previously mentioned alternate input system of the "Headmaster" or a system utilizing detection of output infrared light, after step 8 of defining and storing the row and column locations for each valid icon key (here the x and y coordinates of the keys on the keyboard) and step 9 of lighting valid icon LEDs, the system then outputs a sound wave, for the ultrasonic system, or a light wave, in an infrared system, through output device 7. Then a detector, or plural detectors, detect the sound or light wave at input device 16, located on the user's head, for example, and determines the x and y location of the key which the user is looking at or is pointed at (the direction of his head). Therefore, the user can activate a key merely by positioning his head so as to look at and subsequently simulate activation of a next key at step 10a. Further, the previously mentioned systems are not limited to detection of x and y coordinates, they may detect Δx and Δy or change in x and y positions of the user's head. The use of x and y coordinate locations will hereinafter be described, but it should be known that the present system is not so limited.

By previously defining only a limited number of valid icon keys, erroneous simulated key activation can be reduced. As the x and y coordinate location of a key the user desires to activate is detected by input device 16, these x and y coordinates are then relayed, via wire 11, through input port 13, to microprocessor 4. The microprocessor then relates these x and y coordinates to the keyboard and determines which key corresponds to the x and y coordinates. Then, in step 10b, the microprocessor determines if the corresponding key is one of the previously defined valid icon keys. If the determined key is not one of the valid icon keys, the microprocessor then locates the valid icon key within the closest proximity of the determined key. Therefore, by defining only a limited number of valid icon keys, chance of user input error is strongly reduced. Thus, if a user desires to activate one of the valid icon keys by one of the previously mentioned input systems, he has a larger area of selection than if each of the plurality of keys could be activated. Thus, if the system detects the wrong key, and this key is not a valid icon key, erroneous selection will not occur.

Once a valid icon key is detected, the system proceeds via step 11 of FIG. 7. Similarly to that mentioned previously regarding the step following step 9 of FIG. 7, upon detecting that the symbols do not correspond to a symbol sequence in step 13, and defining valid icon keys and their locations and lighting corresponding LEDs, after step 17 and for each subsequent key activation, an output sound or light wave will be sent from output device 7.

The system then moves to step 11 where it is determined which symbol corresponds to the detected activated key and that determined symbol is subsequently temporarily stored in a temporary memory of the microprocessor with previously determined symbols, in step 12.

In step 13, the microprocessor then accesses the memory to determine whether the temporarily stored symbols in the temporary memory of the microprocessor correspond to any one of the plurality of stored symbol sequences in memory. If it is determined, during this comparison of the temporarily stored symbols with that of each of the plurality of stored symbol sequences in memory, that the temporarily stored symbols do not correspond to any one of the plurality of stored symbol sequences in memory, the system moves to step 14. In step 14, it is again defined which of the plurality of symbol sequences contain the symbols previously stored in the temporary memory of the microprocessor. The symbols corresponding to the symbol sequences which contain the temporarily stored symbols are then defined as a new set of valid icon keys in step 14.

In step 15, the row and column locations of each of the symbols defined as valid icon keys in step 14, are then defined. The system then moves to step 16 where each of the row and column locations of the valid icon keys are temporarily stored. In step 17, a pulse of a predetermined voltage is then output to each of the temporarily stored row and column locations on the keyboard to light visual indicators 5 corresponding to the valid icon keys. These visual indicators or LEDs correspond to the limited number of valid icon keys which can produce a stored message involving the previously activated keys. Thus, this will aid the user in making his selection of subsequent keys. Upon outputting this pulse of a predetermined voltage in step 17, the system then reverts back to step 10 where the row and column of a next key are activated or detected. Thus, a plurality of symbols defining a symbol sequence can be utilized to access a plural word message. Any number of symbols from two (2) to seven (7), for example, may be utilized.

However, in step 13 if it is determined that the temporarily stored symbols correspond to any one of the plurality of stored symbol sequences in memory, during the comparison of the temporarily stored symbol sequences with each of the plurality of stored symbol sequences in memory, the system then moves to step 18. At step 18, the plural word message corresponding to the stored symbol sequence in memory which was previously determined to correspond to the temporarily stored symbols, is then accessed. This plural word message is then output to the specialized processor 10 as shown in FIG. 2 and step 19 of FIG. 7. Subsequently, this plural word message can be processed by a specialized processor 10 and then subsequently output through a speaker 14. The output of the specialized processor, or speech synthesizer, for example, in turn coupled to the speaker 14, can then allow the user to generate audible synthetic speech in a manner which is quick and easily accessible to the user.

From the above-described embodiments of the present invention, it is apparent that the present invention may be modified as would occur to one of ordinary skill in the art without departing from the spirit and scope of the present invention which should be defined solely by the appendant claims. Changes and modifications of this system contemplated by the present preferred embodiments will be apparent to one of ordinary skill in the art.

We claim:

1. A predictive scanning input system for predictive selection of visual indicators corresponding to keys on a keyboard, each key corresponding to one of a plurality of symbols, comprising:

detecting means for detecting activation of a first of a plurality of keys on said keyboard and for detecting the symbol corresponding to said activated key;

memory means for storing a plurality of symbol sequences, each of a plurality of symbols corresponding to a plurality of keys on the keyboard, said memory means further storing a message, one corresponding to each of said plurality of symbol sequences;

comparison means, operatively connected to said detecting means and said memory means, for comparing a detected symbol to said plurality of symbol sequences stored in said memory means, to determine which of said plurality of symbol sequences contain said detected symbol and which, of said plurality of keys, correspond to each of said plurality of symbol sequences; and visual indicator activation means, operatively connected to said comparison means, for activating a visual indicator on each of said plurality of keys determined to correspond to each of said plurality of symbol sequences containing said detected symbol to thereby define a limited number of keys which can produce a stored message involving that detected symbol.

2. The system of claim 1, wherein said system is used as input system for a voice synthesization system.

3. The system of claim 2, wherein said plurality of symbols on said keys include icons.

4. The system of claim 3, wherein said icons are polysemic pictorial illustrations related and corresponding to messages to be retrieved from memory.

5. The system of claim 4, wherein upon activating a plurality of keys, corresponding to a symbol sequences of a plurality of symbols, a corresponding message is accessed from said memory means.

6. The system of claim 5, wherein upon accessing a message, said message is processed and output as a voice message from said voice synthesization system.

7. The system of claim 3, wherein said plurality of symbols on said keys include symbols corresponding to parts of speech.

8. The system of claim 1, wherein said keys on said keyboard are arranged in a plurality of parallel rows in a first direction and a plurality of parallel columns in a second direction, perpendicular to said parallel rows of said first direction.

9. The system of claim 8, wherein said visual indicator activation means includes:
means, for sequentially and alternatingly accessing said plurality of rows and columns of keys on said keyboard corresponding to rows and columns of keys containing said visual indicators and thereby sequentially activating each of said visual indicators on said plurality of keys determined to correspond to each of said plurality of symbol sequences containing said detected symbols, by said visual indicator activation means.

10. The system of claim 9, further comprising:
input means for activating one of said accessed keys corresponding to one of an activated visual indicator, to thereby allow further predictive scanning.

11. The system of claim 1, further comprising:
input means for activating said first of a plurality of keys detected.

12. The system of claim 10, wherein said visual indicator is a light and said input means is a switch.

13. The system of claim 11, wherein said visual indicator is a light and said input means is a switch.

14. The system of claim 9, further comprising:
key activation means for activating one of said accessed keys corresponding to one of said activated visual indicators to thereby allow further predictive scanning.

15. A system of claim 14, wherein said key activation means is a headstick.

16. The system of claim 1, wherein said system is used as an input system for a language translation system.

17. The system of claim 16, wherein said plurality of symbols on said keys include icons.

18. The system of claim 17, wherein said icons are polysemic pictorial illustrations related and corresponding to messages to be retrieved from memory.

19. The system of claim 18, wherein upon activating a plurality of keys, corresponding to a symbol sequences of a plurality of symbols, a corresponding message is accessed from said memory means.

20. The system of claim 19, wherein upon accessing a message, said message is processed and output as a translated message from said language translation system.

21. The system of claim 17, wherein said plurality of symbols on said keys include symbols corresponding to parts of speech.

22. The system of claim 16, wherein said keys on said keyboard are arranged in a plurality of parallel rows in a first direction and a plurality of parallel columns in a second direction, perpendicular to said parallel rows of said first direction.

23. The system of claim 22, wherein said visual indicator activation means includes:
means for sequentially and alternatingly accessing said plurality of rows and columns of keys on said keyboard corresponding to rows and columns of keys containing said visual indicators and thereby sequentially activating each of said visual indicators on said plurality of keys determined to correspond to each of said plurality of symbol sequences containing said detected symbol, by said visual indicator activation means.

24. The system of claim 23, further comprising:
input means for activating one of said accessed keys corresponding to one of an activating visual indicator to thereby allow further predictive scanning.

25. The system of claim 16, further comprising:
input means for activating said first of a plurality of keys detected.

26. The system of claim 24, wherein said visual indicator is a light and said input means is a switch.

27. The system of claim 25, wherein said visual indicator is a light and said input means is a switch.

28. The system of claim 23, further comprising:
accessed key activation means for activating one of said accessed keys corresponding to one of said activated visual indicators to thereby allow further predictive scanning.

29. The system of claim 28, wherein said key activation means is a headstick.

30. The system of claim 6, wherein said voice message is output as an audible message from a speaker of said voice synthesization system.

31. The system of claim 6, wherein said voice message is output as a printed message from a printing means of said voice synthesization system.

32. The system of claim 20, wherein said translated message is output as an audible message from a speaker of said language translation system.

33. The system of claim 20, wherein said translated message is output as a printed message from a printing means of said language translation system.

34. A method of predictive input scanning for predictive selection of visual indicators corresponding to keys on a keyboard, each key corresponding to one of a plurality of symbols, comprising:

a) detecting activation of a first of a plurality of keys on said keyboard and detecting the symbol corresponding to said activated key;

b) storing a plurality of symbol sequences, each comprising a plurality of symbols corresponding to a plurality of keys on the keyboard, and further storing a message, one corresponding to each of said plurality of symbol sequences;

c) comparing said detected symbol to said plurality of stored symbol sequences, to determine which of said plurality of symbol sequences contain said detected symbol and which, of said plurality of keys, correspond to each of said plurality of symbol sequences;

d) activating a visual indicator on each of said plurality of keys determined to correspond to each of said plurality of symbol sequences containing said detected symbol to thereby define a limited number of keys which can produce a stored message involving that detected symbol.

35. The method of claim 34, wherein said method is used as an input method for a voice synthesization system.

36. The method of claim 35, wherein said plurality of symbols on said keys include icons.

37. The method of claim 36, wherein said icons are polysemic pictorial illustrations related and corresponding to messages to be retrieved from memory.

38. The method of claim 35, further comprising the steps of:
   e) activating a plurality of keys, corresponding to a symbol sequence of a plurality of symbols; and
   f) accessing a corresponding message.

39. The method of claim 38, further comprising the steps of:
   g) processing and outputting said as a voice message from said voice synthesization system upon accessing said corresponding message.

40. The method of claim 36, wherein said plurality of symbols on said keys include symbols corresponding to parts of speech.

41. The method of claim 34, wherein said keys on said keyboard are arranged in a plurality of parallel rows in a first direction and a plurality of parallel columns in a second direction, perpendicular to said parallel rows of said first direction.

42. The method of claim 41, wherein said step of activating includes:
   accessing said plurality of rows and columns of keys on said keyboard sequentially and alternatingly, corresponding to rows and columns of keys containing selected visual indicators, and thereby sequentially activating each of said visual indicators on said plurality of keys.

43. The method of claim 42, further comprising the step of:
   e) activating one of said accessed keys corresponding to one of an activated visual indicator, to thereby allow further predictive scanning.

44. The method of claim 42, further comprising the step of:
   e) activating one of said accessed keys corresponding to one of said activated visual indicators, to thereby allow further predictive scanning.

45. The system of claim 10, further comprising:
   error limiting means, for inhibiting activation by said scanning means of each of said input keys corresponding to said visual indicators which have not been activated, so as to reduce any chance of input error by said input means.

46. The method of claim 43, further comprising the step of:
   f) inhibiting activation of said input keys corresponding to visual indicators which have not been activated, so as to reduce any chance of input error during the step e) of activating.

47. A method, as claimed in claim 34, wherein said method is used as an input method for a language translation system.

48. The method of claim 47, wherein said plurality of symbols on said keys include icons.

49. The method of claim 48, wherein said icons are polysemic pictorial illustrations related and corresponding to messages to be retrieved from memory.

50. The method of claim 49, further comprising the steps of:
   e) activating a plurality of keys, corresponding to a symbol sequence of a plurality of symbols; and
   f) accessing a corresponding message.

51. The method of claim 50, further comprising the step of:
   g) processing and outputting said message as a translated message from said language translation system upon accessing said corresponding message.

52. The method of claim 48, wherein said plurality of symbols on said keys include symbols corresponding to parts of speech.

* * * * *